United States Patent

[11] 3,628,665

[72] Inventor  Lubertus Bakker
              Wellsville, N.Y.
[21] Appl. No. 13,637
[22] Filed     Feb. 24, 1970
[45] Patented  Dec. 21, 1971
[73] Assignee  The Air Preheater Company Inc.
              Wellsville, N.Y.

[54] FLOATING OIL CONTAINMENT APPARATUS
     1 Claim, 3 Drawing Figs.
[52] U.S. Cl. .................................... 210/242,
                                              210/DIG. 21
[51] Int. Cl. .................................... E02b 15/04
[50] Field of Search ............................ 61/1 F;
                                              210/242, DIG. 21

[56] References Cited
     UNITED STATES PATENTS
     3,508,652  4/1970   Woolley ............. 210/DIG. 21
     3,219,190  11/1965  Thune .............. 210/DIG. 21
     3,495,561  2/1970   Trapp ............... 210/DIG. 21
     3,532,219  10/1970  Valdespino ......... 210/DIG. 21

Primary Examiner—Samih N. Zaharna
Attorneys—Wayne H. Lang and Eldon H. Luther

ABSTRACT: Apparatus for restraining an oil slick floating freely on the surface of a body of water whereby it is at all times under control and not fee to spread with movement of water to contaminate the surrounding areas. The oil slick controlling apparatus contains oil-water separation means whereby oil may be removed from the oil slick for further utilization.

PATENTED DEC 21 1971　　　　　　　　　　　　　　3,628,665

INVENTOR.
Lubertus Bakker

BY

Wayne H. Lang
AGENT

FLOATING OIL CONTAINMENT APPARATUS

BACKGROUND OF THE INVENTION

1. Field of the Invention

This invention relates generally to an oil slick containment apparatus including means for separating oil from contaminating water whereby the oil thereof is not permitted to spread widely and become a hazard for animal life and vegetation.

2. Description of Prior Art

The recent development in the art of "off-shore" drilling for oil as well as the use of large tankers for oil transportation has accentuated the fact that the failure of such systems may set free vast amounts of oil which when floating freely on the surface of the water become impossible to control and thus subject to contaminate and pollute vast surrounding areas.

Inasmuch as the critical problem of widespread oil pollution has developed only recently, little has been done in the art to prevent the spread of an unwanted oil slick before it develops. While patents as represented by U.S. Pat. No. 3,468,421 have been developed to separate oil from water, such means have not been satisfactorily applied to apparatus in a way that it can contain a continuing source of oil that is leaking into a body of water and thus prevent the pollution of an area by an unwanted quantity of oil.

SUMMARY OF THE INVENTION

The present invention therefore relates to a device which prevents the spreading of a quantity of oil in the form of an oil slick floating freely on the surface of the water to surrounding areas.

The device of the present invention comprises essentially an oil-water separator which is included within a containment ring in the form of an annular boom floating on the surface of the water and surrounding a continuing source of contaminating oil. The oil-water separator may be made to occupy only one or several of many articulated sections which comprise the containment ring or annular boom around the oil slick. Thus the size and effectiveness of the apparatus may be varied to meet the existing need by the addition to or the deletion of one or more sections. Sections of the containment ring not used to house the oil-water separation means may contain storage tanks for oil as it is removed from the water.

DESCRIPTION OF THE DRAWING

These and other objectives of my invention are accomplished effectively and will become more apparent when viewed in conjunction with the accompanying drawing in which.

Figure 1:
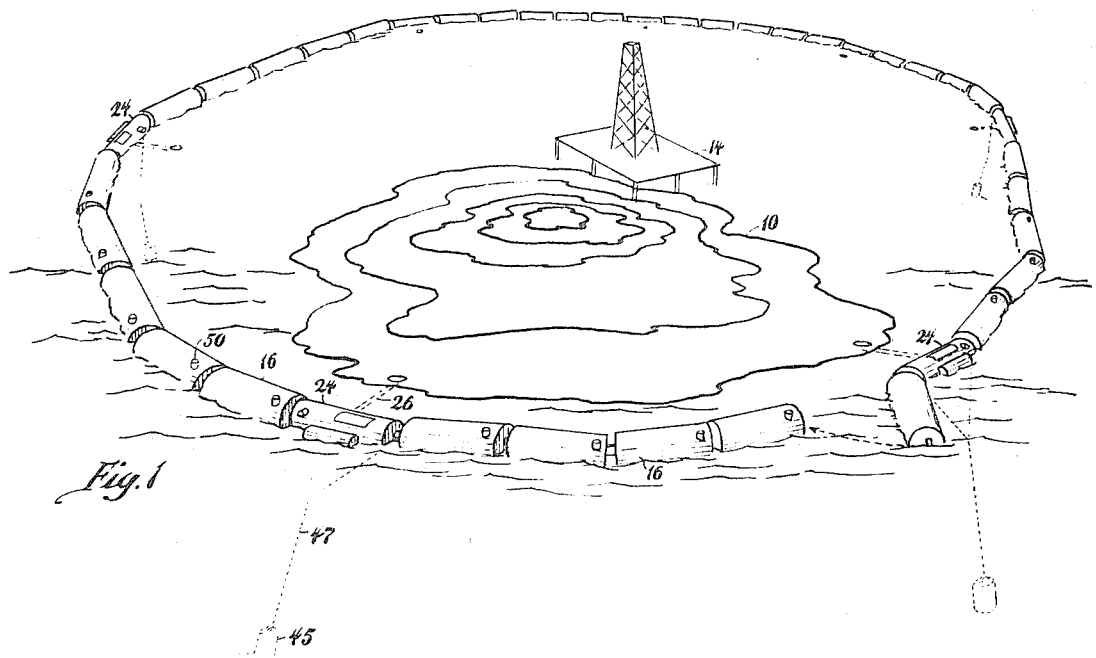
FIG. 1 diagrammatically illustrates a typical oil containment ring comprised of flotation sections which house oil-water separation means between other sections housing oil storage tanks.

In the drawing an oil slick 10 is shown as floating on the surface of the body of water adjacent an offshore oil-drilling platform 14. Although the source of oil polluting the surrounding water is indicated as coming from a subsurface break in the well adjacent the drilling platform, a wrecked oil tanker, an industrial leakage of oil, or any other source of leaking oil would be an equally suitable source of contaminating oil for use of this containment device.

Figure 2:
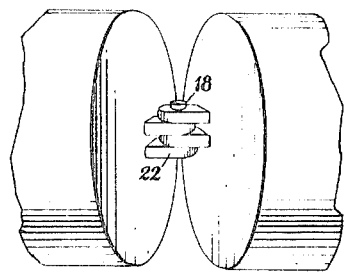
FIG. 2 illustrates, by way of example, an articulated joint between adjacent tanks.
Figure 3:
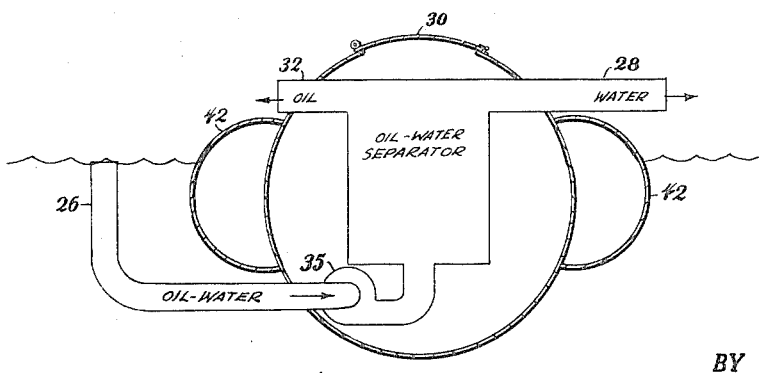
FIG. 3 is a cross-sectional view as seen at 3—3 of a floating segment having an oil separation means.

The containment device comprises essentially a multiplicity of individual tanks 16 in an end-to-end arrangement and pivotally linked together to form an endless containment ring extending around the oil slick. The exact linkage used to join adjacent tanks together is of little significance inasmuch as various types of pivotal linkage could be satisfactorily used, an example of which is shown in FIG. 2 of the drawing wherein a pin 18 merely links the apertured extensions 22 of each segment together to form a pivoted joint.

Depending upon the size of the oil slick and the amount of oil to be separated from the water, a number of tanks of the containment ring are interspersed by tanks other than tanks 24 housing an oil-water separator. Each of the tanks housing an oil-water separator has an inlet duct 26 for the oil-water emulsion that may be deployed toward the greatest concentration of oil-water emulsion of the oil slick, an outlet 28 for water which has been separated from the oil, and an outlet port 32 for oil which has been separated from the water. The oil which has been separated from the water may be pumped directly through port 32 to an independent collection tank, or it may be stored in one of the adjacent tanks 16 of the adjacent tanks 16 of the containment ring until such time as it may be collected and removed therefrom. Thus oil, after separation from the water, is exhausted through port 32 and connecting duct 36 to an adjacent storage tank 16 having suitable porting connections. Simultaneously, water separated from the oil is ejected through an outlet port 28 directly to the clean water outside the oil slick and separated therefrom by the containment ring.

In order that the oil-water separator will float upright in the water at all times, flotation tanks 42 are secured to each side of the segment housing an oil-water separator. Moreover, each segment housing an oil-water separator has an anchor 45 secured thereto by a cable 47 that provides stability to each oil-water separator and the intervening oil storage tanks 16. If the containment apparatus is to be located in basically still or calm water areas, the anchors may be replaced by guy wires or lines to the shore or other stabilized areas.

Electric power for the various pumps of an oil-water separation segment of the oil containment ring may be provided by any suitable source that is housed on the drilling platform 14, in a section of the containment ring itself, or if available, brought in from an outside source.

On occasion the source of oil is other than an offshore well and prevailing winds or currents force the oil slick emanating therefrom to float in a single direction "downwind" from its source. In such an instance the oil containment "boom" need be formed only in semicircular form on a single side of the oil source to receive the entire flow.

Selected tanks may be provided with a quick or easily actuated release 50 whereby they may be moved aside to provide an opening that permits a floating tank, a barge or other work ship to come into the area enclosed by the oil containment boom 16 in the manner shown in FIG. 1.

The tank sections may be assembled or linked together on shore or at a staging area and then towed into position by a suitable tugboat or other vessel. Otherwise the separate units may be delivered via shipboard and assembled at the point of use. Whether the segment tanks 16 that comprise the oil slick containment barrier are linked together so that they extend completely or partially around the source is dependent upon such variables as the amount of oil that is leaking into the water, the prevailing winds and currents, and likelihood of contamination in nearby areas. For massive or continuous leakage an array of two or more concentric containment rings may be adapted to encircle the floating "oil slick."

The tanks 24 in which the oil-water separators are housed are preferably formed of welded steel plate having an access door 30 on the top thereof through which are supplied the various elements which comprise the oil-water in accordance with U.S. Pat. No. 3,468,421. Each oil-water separator tank 24 is additionally provided with flotation tanks 42 and an anchor 45 held by anchor line 47 whereby the tank housing the oil-water separator is maintained relatively stable in all types of weather and sea conditions.

The tanks 16 linking the oil-water separator tanks 24 are elements of the oil containment boom that may be used as storage tanks for the oil removed from the oil slick or simply as links in the boom that encircles the oil slick. Connections 50 in each tank permit the supply or exhaust of oil to a convenient storage area.

The tanks 16 may be of standard metallic plate construction, or they may be formed from rubberized fabric that enables them to be transported in deflated condition on a barge or the open deck of a ship, and upon inflation serving as links in the containment boom.

In operation the oil-water emulsion of the oil slick is drawn inward through inlet duct 26 by pump 35 to an oil-water separator of the type represented by U.S. Pat. No. 3,468,421. The oil removed therefrom is then directed outward through duct 32 to a storage tank while substantially pure water is exhausted through exhaust port 28 to the space outside the containment boom.

Finally, the number and relative positioning of the several tank segments 16 that contain the oil-water separation means is also dependent, to a great extent, upon the quantity of oil that is being released into the water and upon the prevailing winds and currents, it being understood that various arrangements may be made within the purview of this invention.

What I claim is:

1. Apparatus for the containment of an oil slick comprising a substantially annular articulate boom including a series of pivotally connected independent tank sections, oil-water separation means carried by a plurality of the tank sections of said annular boom, a plurality of said tank sections comprising oil storage tanks intermediate the tank sections housing the oil-water separation means, duct means connecting the oil-water separation means to the oil storage tanks for storing oil separated from water, radially disposed inlet ducts for the oil-water separation tanks extending inward from the tanks housing the oil-water separation means into the space enclosed by the articulate boom whereby oil from the oil slick enclosed thereby may be directed into the tanks housing the oil separators and then stored in the interconnected oil storage tanks.

* * * * *